April 28, 1964   H. G. PARKE   3,131,346
DIFFERENTIAL SALINITY INDICATING EQUIPMENT
Filed Sept. 15, 1959   6 Sheets-Sheet 1
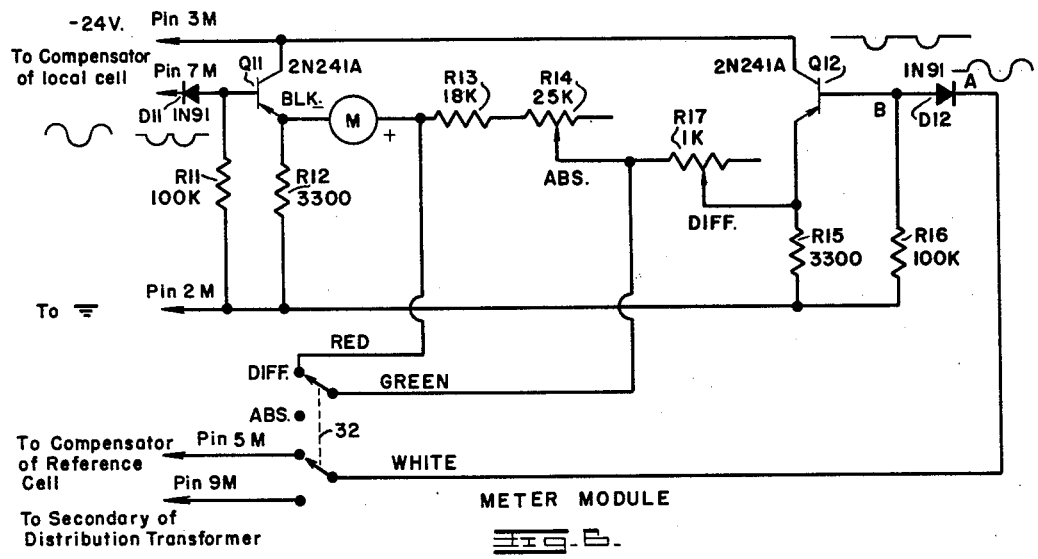
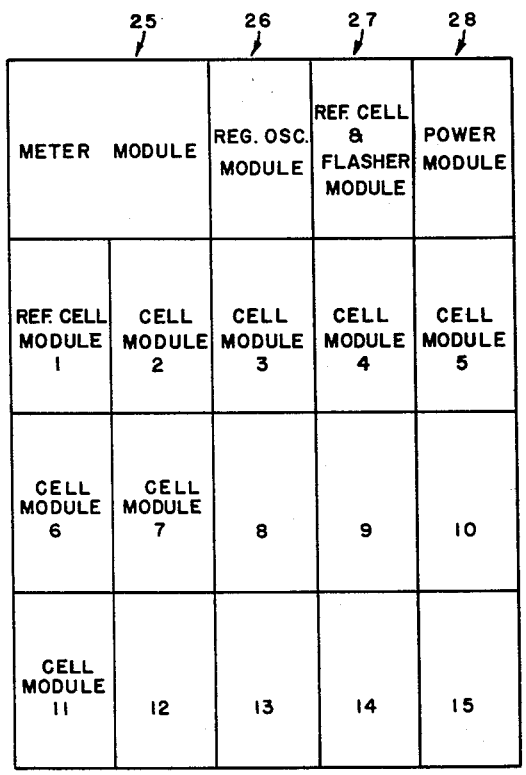
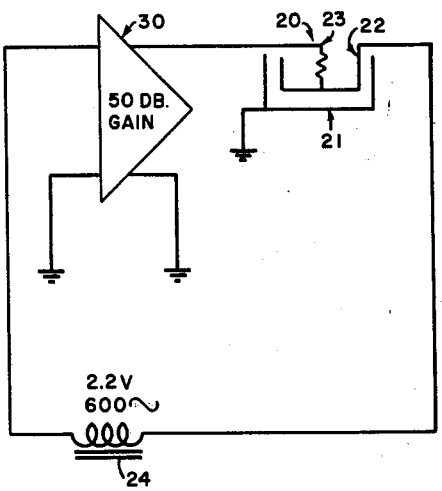
INVENTOR.
HARRY G. PARKE April 28, 1964          H. G. PARKE          3,131,346

DIFFERENTIAL SALINITY INDICATING EQUIPMENT

Filed Sept. 15, 1959          6 Sheets-Sheet 2

INVENTOR.
HARRY G. PARKE
BY
ATTORNEY

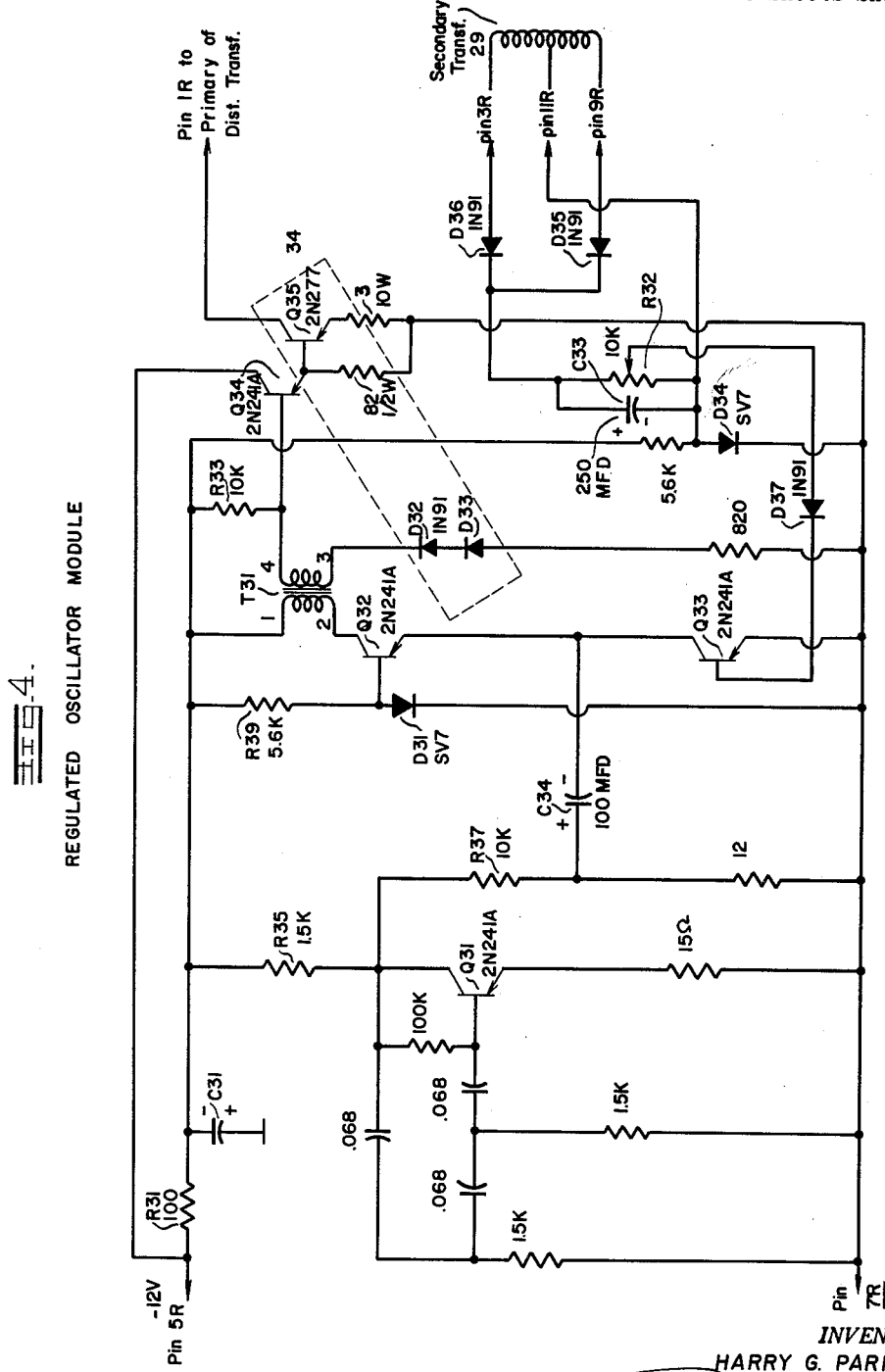

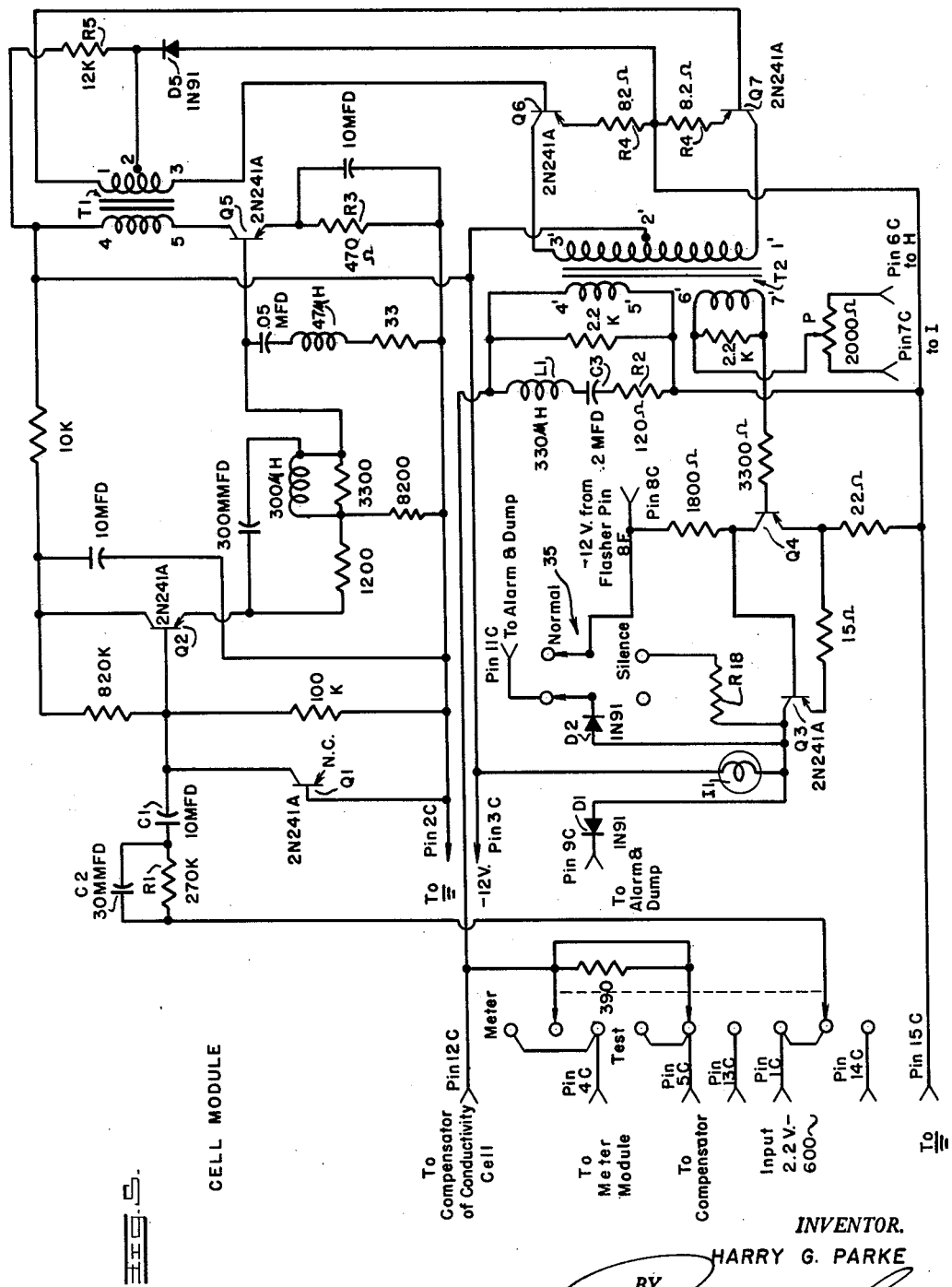

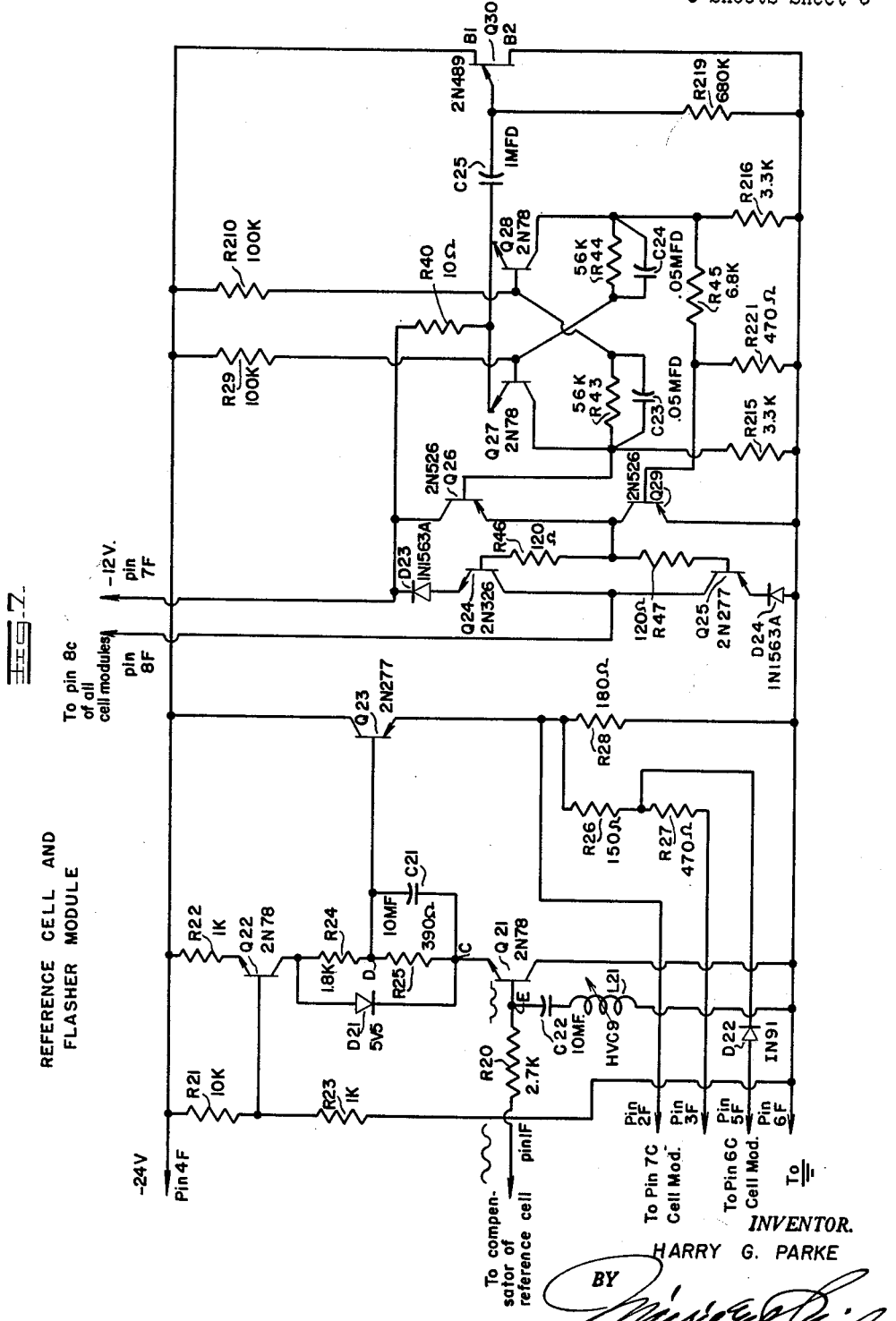

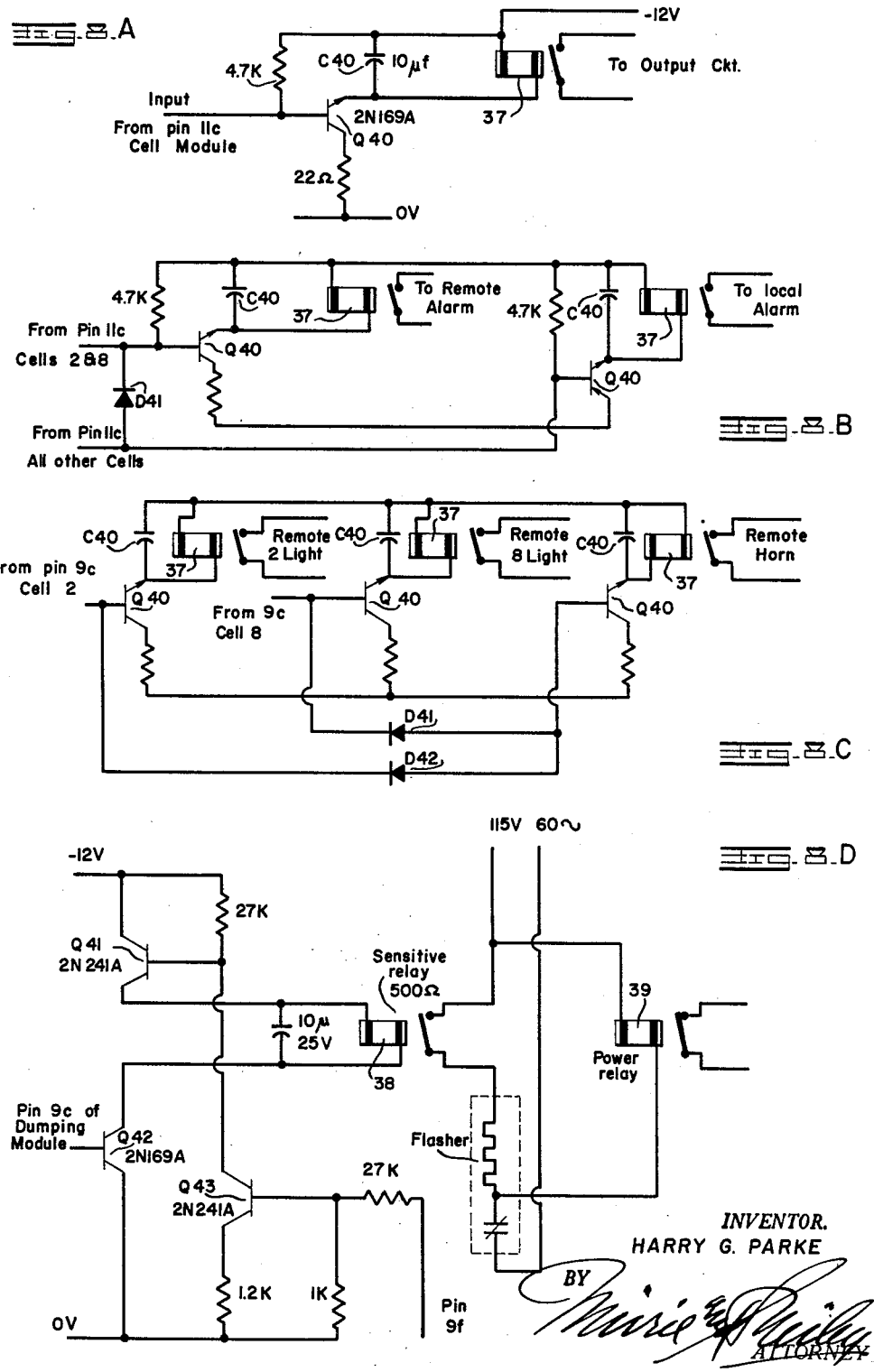

United States Patent Office 3,131,346
Patented Apr. 28, 1964

3,131,346
DIFFERENTIAL SALINITY INDICATING
EQUIPMENT
Harry G. Parke, Bellmore, N.Y., assignor to Marine
Electric Corporation, Brooklyn, N.Y., a corporation of
New York
Filed Sept. 15, 1959, Ser. No. 840,109
9 Claims. (Cl. 324—30)

This invention relates generally to apparatus for measuring the salinity of a fluid and more particularly to improvements in such apparatus which enable the direct measurement of salinity at different points in a fluid system, and subtraction from such readings of the reading at a reference point so that the difference when in excess of a predetermined value may be used to automatically operate an alarm or dumping circuit.

Standard equipment has been available to indicate and warn personnel aboard ship, and in other applications as well, of water contamination. Such equipment is particularly useful for the constant monitoring of purity of boiler feed and condensate, evaporator tube nest drains, heat exchanger drains, condenser extraction water and numerous other points in the water systems aboard ship. Boiler water invariably has boiler compound chemicals dissolved in it to prevent boiler corrosion. With oil fired boiler propulsion systems superheaters are used, hence the boiler compound never appears in the condensed steam. Nuclear systems, however, whether for propulsion or other applications use saturated steam so that small droplets of water, containing dissolved boiler compound, are carried through the system and appear in the condensate. It is the additional salinity over that produced by the boiler compound that is significant and an indication of corrosion and leakage. The amount of boiler compound carryover varies with the engine speed and various other factors so that a fixed correction would not suffice. Therefore conventional indicating equipment cannot be used with nuclear systems.

In the present invention a conductivity cell is placed in a small, air cooled condenser right off the main steam line, and the salinity reading of this cell is used as a reference since it indicates boiler compound carryover only. Any increase of apparent salinity over this reference cell reading is an indication of corrosion. Other cells are therefor placed at strategic locations in the water system and the difference in salinity read by one of such cells with respect to the reference cell is utilized to operate alarm and dumping apparatus.

Accordingly it is a primary object of this invention to provide an apparatus for nuclear system, or other applications, which enables direct readings of the salinity at spaced points in a fluid which may then be subtracted from the reading of a reference cell suitably located in the fluid to indicate corrosion.

Another object of the invention is to provide apparatus of the described character to continuously monitor the salinity of a fluid which is capable of indicating either or both differential salinity readings with respect to the reference cell or absolute salinity readings at spaced locations.

A further object of the invention is to provide in an apparatus of the described character suitable alarm, signal and dumping circuits and means.

A still further object of the invention is to provide apparatus of the described character which is modularized and transistorized and therefor has attendant advantages such as reliability, ease of maintenance, use of low voltage supply and the like.

Yet another object of the invention is to provide in apparatus of the described character a simplified circuit including a high gain negative feedback amplifier serially connected with a conventional temperature compensated conductivity cell to obtain direct salinity readings across the cell and compensator element in series.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures and in which:

FIG. 1 is a block diagram illustrating a preferred circuit for obtaining a salinity reading across a conductivity cell proportional to the ratio of the temperature compensator resistance and the cell resistance and hence directly proportional to the salinity;

FIG. 2 is a diagram showing one of many possible arrangements of conductivity cell modules and auxiliary apparatus modules required for indicating and alarm functions on a central control panel;

FIG. 4 is a schematic circuit diagram of the Regulated Oscillator module indicated in FIG. 2;

FIG. 5 is a schematic circuit diagram representative of any one of the Cell Modules indicated in FIG. 2;

FIG. 6 is a schematic circuit diagram of the Meter Module;

FIG. 7 is a schematic circuit diagram of the Reference cell and Flasher Module; and FIGS. 8A, B, C and D are schematic circuit diagrams of various alarm connections.

Figure 3:
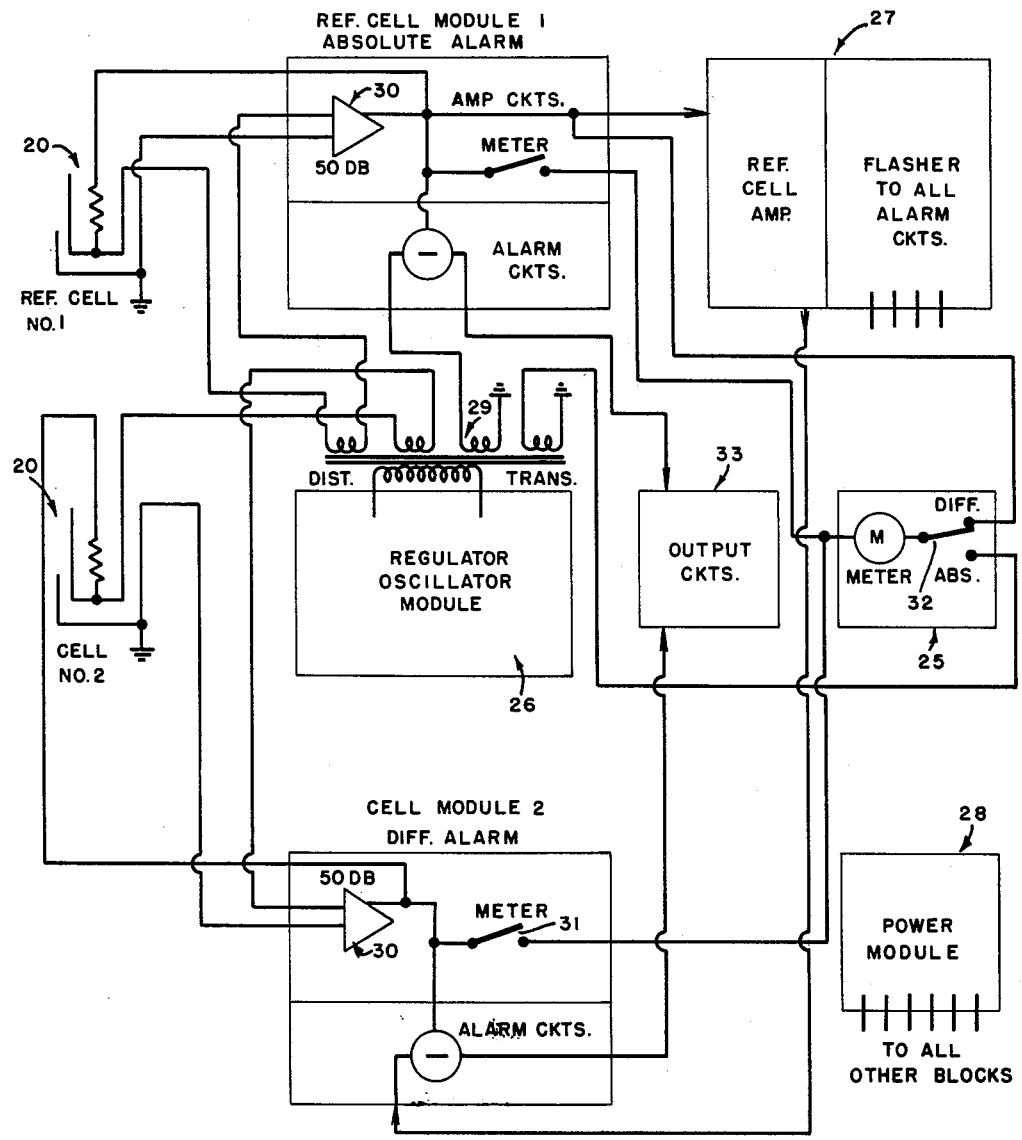
FIG. 3 is a simplified block diagram illustrating the overall circuitry and method of operation of two conductivity cells only, one cell being the reference cell.

Referring now to the drawings in more particular, FIG. 1 outlines a preferred circuit for obtaining direct salinity measurements and which is the basic circuit for each cell module used in the present invention. The conductivity cell generally indicated at 20 may be of conventional type such as explained in full detail in the Ingram Patent, 2,533,462. Broadly cell 20 comprises an outer electrode 21 and an inner electrode 22 immersible in the fluid to be measured and a temperature sensitive element 23, normally termed a compensator, which is positioned adjacent one of the electrodes. The temperature compensator behaves electrically exactly as if it were a cell, at the same temperature as the fluid being measured but with a constant chloride contamination of 1.708 parts per million.

An important step in obtaining a differential indicating alarming panel is to obtain a voltage directly proportional to specific conductivity, that is, a voltage that is directly proportional to the ratio of two resistances, the resistance of the compensator divided by the resistance of the cell. According to the present invention the cell 20 is connected up as a voltage divider, one arm of it being the compensator 23, the lower arm being the cell proper. The top of the voltage divider is driven by the output of amplifier 30. This amplifier preferably has a voltage gain of about 300, or expressed another way, of 50 db. The input of the amplifier is 2.2 volts obtained from an A.C. source 24, minus the voltage drop across the cell proper, that is, the voltage drop between the inner and outer electrodes. The output of amplifier is connected to the other terminal of the compensator 23 so that the compensator and the cell proper (inner and outer electrodes) in series and connected to ground constitute and output circuit which has a negative feed back to the amplifier which includes the compensator connected at the electrode 22 to the input circuit. The voltage between the inner and outer electrodes is thereby also maintained at almost exactly 2.2 volts, since if the voltage tends to drop below 2.2 volts the difference will be applied to the input of the amplifier, amplified over 300 times and applied back to the top of the voltage divider. If, on the other hand, the cell voltage rises above 2.2 volts, the difference, now negative, will be amplified 300 times and applied again at the top of the divider in such a manner as to reduce the voltage present between the inner and outer electrodes.

Since the input resistance of the amplifier is very high all the current which flows through the lower portion of the voltage divider also flows through the top portion and vice versa. Call the resistance between the electrodes $R_E$, the resistance of the compensator $R_C$, then since there are 2.2 volts across the electrodes, the current that flows in the voltage divider will be $2.2/R_E$. This current also flows through the compensator resistance where it produces voltage $$2.2 \frac{R_C}{R_E}$$

The voltage from compensator to outer electrode will therefore be $$2.2 + 2.2 R_C/R_E \text{ or } 2.2\left(1 + \frac{R_C}{R_E}\right)$$

Since the resistances are proportional to 1 over the conductivity and since the compensator behaves thermally as though it were a cell containing 1.708 p.p.m. chloride the voltage present from the compensator lead to grounded outer electrode lead is therefore $$2.2\left(1 + \frac{1}{1.708} \div \frac{1}{S}\right), \text{ or } 2.2\left(1 + \frac{S}{1.708}\right)$$

volts, where S is a specific conductivity in parts per million of chloride. Thus the objective of obtaining a voltage directly proportional to the specific conductivity or salinity has been met.

In FIG. 2 is shown a possible control panel arranged for monitoring the salinity of a fluid system embodying 15 circuit modules termed cell modules each embodying a conductivity cell and an amplifier connected as in FIG. 1. Each of the cells would be immersed in the fluid at a different location and the conductivity cell of the first module labeled Reference Cell Module 1 being the reference cell and appropriately located just off the main steam line. The apparatus includes a meter module 25, a Regulated Oscillator Module 26, a Reference Cell and Flasher Module 27 and a Power Module 28. The Power Module comprises a more or less conventional circuit for converting 60 cycle 115 volt A.C. power to —24 volt and —12 volt D.C. and embodies a transformer and rectifiers plus filtering elements which are not shown in detail since they form no part of this invention. Similarly a terminal connection board and other apparatus of conventional nature are omitted from FIG. 2 and subsequent figures.

The overall method of operation of the equipment may be noted with reference to the simplified diagram of FIG. 3 in which only two conductivity cells of the fifteen are shown. The Reference Cell Module is connected for alarming on absolute specific conductivity, and Cell Module #2 is connected for alarming on the difference in specific conductivity between the water at cells #1 and #2.

Signal source for the entire panel is the Regulated Oscillator Module 26 which generates a constant amplitude 600 cycle voltage which is applied, by separate windings on the distribution transformer 29, to each cell module. The method of operation described above causes the voltage at the amplifier output of each Cell Module to be proportional to the specific conductivity of the water in its cell. Thus when the Meter Switch 31 on any Cell Module is turned, while the switch 32 on the Meter Module is at ABSolute, the meter M will read the voltage developed and therefore the specific conductivity of that cell. When the switch on the Meter Module is at DIFFerential the other end of the meter will return to the amplifier output of Cell Module #1 and therefore the meter reading will indicate the differential specific conductivity.

The alarm circuits are indicated in the lower half of each cell module, and operate on a difference of voltages: The difference between the amplifier output voltage and a fixed voltage for Cell Module #1 and other cell modules with positions connected for absolute alarming; or, in the case of Cell Module #2 and other cell modules with position connected for differential alarming, the difference in amplifier output voltages between the supervised and reference cells (the reference cell amplifier has an effective gain of 1).

In either case when the local amplifier output voltage sufficiently exceeds the subtracted voltage the alarm circuits fire and apply signal to the output circuits block 33 and local indicator light.

A preferred embodiment of the Regulated Oscillator Module 26 is schematically diagrammed in FIG. 4.

Since the specific conductivity is read on what is basically a voltmeter, and since all voltage levels are dependent on the output of the regulated oscillator, if any error were to develop in the output level of the regulated oscillator from changing line voltage or from aging, all specific conductivity readings on the meter would be similarly in error. The regulated oscillator, therefore, is designed to provide a substantially constant output A.C. voltage over a wide range of temperatures and power supply voltage range. The regulated oscillator is powered from the minus 12 volt D.C. supply which enters through pin 5R. Resistor R31 and capacitor C31 act to further filter and decouple the low level stages. The 600 cycle signal starts in a phase shift oscillator shown in the left of the diagram. The voltage at the collector of transistor Q31, is returned to the base of the same transistor after having passed through the phase shift network composed of the three .068 microfarad capacitors and two 1,500 ohm resistors. The effect of this network is to shift the phase at a frequency of 600 cycles by 180°, while at the same time attenuating the signal by a factor of 29. Since transistor, Q31, with a 15 ohm resistor in its emitter lead, has a gain slightly greater than 29, oscillation will take place. The circuit is basically the same as the familiar vacuum tube phase shift oscillator. The output voltage from the phase shift oscillator varies with the D.C. voltage supplied to the oscillator and is of not particularly good wave form. It is at a level of about 3 volts. Approximately one-thousandth of this voltage is tapped off by the 10,000 ohm and 12 ohm voltage divider R37 and applied through capacitor C34 to the junction of the collector of Q33 and the emitter of Q32. The base of Q32 is held at a constant D.C. voltage by the voltage regulator diode D31. This is an SV7, a type very similar to the SV5 used in the reference cell amplifier but one which has a maintaining voltage level of 7 volts. As is the case in almost all emitter followers, the voltage on the emitter of Q32 will be almost exactly the same as the constant voltage applied to the base of Q32. The current, therefore, that will flow through Q32 will be determined by the impedance of Q33. If it is high, a very small current will flow; if it is low, a comparatively large one will flow. It is characteristic of junction transistors that their A.C. emitter input impedance is a very rapidly varying function of the D.C. current flowing in the emitter circuit. Therefore, if Q33 is of high resistance, very little current will flow through Q32 the input A.C. impedance of Q32 will be high and very little current will flow from the A.C. voltage being applied there. On the other hand, if Q33 is acting as a low resistance a large D.C. current will flow through the emitter of Q32 and a large A.C. current will also flow into the emitter of Q32. Since the 12 ohm resistor and the 100 microfarad capacitor are quite small impedances at 600 cycles per second, the junction point of Q32 and Q33 is effectively being driven from a constant voltage source. Since the collector impedance of Q33 is always very high practically all the current that flows in the circuit will be that flowing through the emitter of Q32. This current will then also, of course, flow in the primary of transformer T31. The lower terminal of the secondary of T31 is connected to the two diodes in series, D32 and D33, which act as biasing resistors in a manner which will be explained later. The upper portion is applied to the driver transistor Q34, which is connected as an emitter follower and drives the power transistor, Q35. This transistor operates as a Class A single-ended amplifier and its collector is connected through pin 1R to the primary of the distribution transformer 29 in the panel, which distributes the 2.2 volts to all cell modules, as well as providing 600 cycles for other purposes in the panel. The other side of the primary is returned to the minus 12 volts supply. Connected across the primary (but not in the module) is a 6 microfarad capacitor which acts to shunt out harmonics and improve the wave form. A center tapped winding on the distribution transformer is returned to pins 3R and 9R, of the regulated oscillator module. The center tap of this winding is returned through pin 11R, to the top of diode D34, the second SV7 diode. Like D31, this diode maintains a constant voltage of 7 volts above ground regardless of wide fluctuations in the power supply voltages. The A.C. voltages applied to pins 3R and 9R is rectified by diodes D35 and D36, filtered by capacitor C33 and applied across potentiometer R32. The voltage at the movable arm of potentiometer R32 will therefore, be minus 7 volts, from which is subtracted the portion of the rectified voltage developed and tapped off. The voltage taken off from this potentiometer is applied to the base of Q33 through diode D37 and therefore, since the emitter of Q33 is grounded, determines the current that will pass through Q33 and hence through Q32. If this voltage is more than a few tenths of a volt negative a large current can be drawn by Q33. If, on the other hand, this voltage becomes even slightly positive, Q33 can be entirely cut off and draw almost no current. The method of regulation can now be seen. When the equipment is first started there is no charge on capacitor C33 and consequently minus 7 volts are applied through the potentiometer R32 to the base of Q33. Consequently, Q33 is a very low impedance and Q32 also will present a very low input impedance. A large A.C. current will therefore be passed from the emitter to the collector of Q32, which will excite transformer T31 to a high voltage. This voltage will be passed and further amplified by Q32 to Q34 to Q35 which will drive the output distribution transformer at a high level. A large voltage will therefore be developed between pins 3 and 9, and positive voltage will begin to build up on capacitor C33. A portion of this positive voltage will be tapped off by the potentiometer. This positive voltage will oppose the negative voltage from diode D34 and will act to reduce the current flowing through Q33 and hence the gain of Q32. Eventually, the capacitor C33 will charge high enough so that the 7 volts from diode D34 are almost completely neutralized and that Q33 is left with a small bias on the order of a tenth of a volt. Should anything occur to increase the output voltage level from the phase shift oscillator, this will tend to increase the output from the distribution transformer. This output will be rectified and a portion of it applied to the base of Q33 which will tend to reduce the gain of the assemblage of Q32, Q33, Q34 and Q35. The net result will be that the output voltage will stay almost constant. If the output from the phase shift oscillator should drop, precisely the reverse would take place. Since R32 is a large resistor, capacitor C33 will charge up to the peak value presented between the center tap and pins 3R and 9R. The operating level will be automatically adjusted so that the D.C. voltage tapped off by the center arm of potentiometer R32 will always be 7 volts. Thus, if the potentiometer is set to the very top of the winding, 7 volts D.C. will be generated by the rectifiers D35 and D36, and therefore, the voltage between the center tap and pins 3R and 9R will also have a peak voltage of 7 volts. If the potentiometer tap is set ⅔ of the way down again, 7 volts will be developed from the tap to the top of D34. Therefore, 10½ volts will be developed across all of R32 and the voltage from the distribution transformer must be 10½ volts peak, etc.

The setting of potentiometer R32 is therefore used to adjust the output level of the regulated oscillator. As in all Class A amplifiers, it is necessary to so bias the transistor, Q35, so that the D.C. current through it is somewhat larger than the peak value of A.C. current. If it were attempted to bias this transistor at a fixed voltage, difficulties would arise from changing ambient temperatures. At higher temperatures less D.C. voltage would be needed to maintain the same base current and hence the same collector current and the collector current would greatly increase. This occurs because the D.C. base input resistance in the transistor in a conducting state falls off very rapidly with temperature. In order to obtain stability it is necessary to bias the transistor from a voltage which will change in the same way. This is obtained by the voltage drop across D32 and D33, the diodes which are biased in a forward direction by the current through resistor R33. This voltage is applied through the secondary of transformer T31 to the base of the driver Q34 from which it is applied by an emitter follower action to the base of Q35. The transistor Q35 is mounted on a heavy copper strap 34 indicated by broken lines in FIG. 4, in which two holes are drilled, containing D32 and D33 which are in close thermal contact but electrically insulated from the copper strap. The copper strap 34 has very low resistance to the flow of heat. Hence, the transistor and the biasing diodes D32 and D33 are maintained at equal temperatures regardless of ambient temperature changes or heating from the power dissipation in the transistor. Therefore stable biasing is obtained.

The fifteen Cell Modules of the Salinity Indicator are all alike and preferably employ the circuit shown in FIG. 5.

The amplifier consists of transistors Q1, Q2, Q5, Q6 and Q7 and their associated transformers and other parts. The input signal, consisting of the difference between the 2.2 volts from the regulated oscillator taken from the secondary of the distribution transformer 29, and the voltage developed between the inner and outer electrodes, of the associated conductivity cell, is applied to pin 1C and through the 270,000 ohm resistor R1 and capacitor C1 to the base Q2. Q2 acts as an emitter follower. It has a voltage gain of approximately 1 and maintains a very high input impedance. This is necessary to keep the amplifier input impedance from affecting the specific conductivity reading. From the emitter of Q2, the signal is applied through a frequency connecting network to the base of Q5.

Q5 is connected as a grounded emitter, Class A transformer coupled amplifier and the output is applied from the split secondary of the transformer T1 to the bases of Q6 and Q7, the output amplifier. These transistors are connected push-pull Class B. The entire amplifier is powered by a negative 12 volts D.C. supply, which is applied to pin 3C. There are two positive returns, a low level on pin 2C and a high level on pin 15C. This separation of ground returns is necessary to prevent undesired feedback from the output to the input circuits. The output is taken from terminal 4', of the output transformer T2, and applied through pin 12C of the module plug, from whence it goes to the compensator lead of the cell. The other end of the output winding, terminal 5' of transformer T2, goes to the high level positive return pin 15C of the module plug.

Most of the other components present are required for shaping the frequency characteristics of the amplifier. Although the illustrated amplifier is intended to work at 600 cycles, its gain characteristics must be controlled over a very wide frequency range. This is because the amplifier would oscillate at any frequency at which 180° phase shift took place while its gain was still greater than 1. To prevent this from happening, it is necessary to shape the frequency gain characteristics of the amplifier so that the gain at increasing frequencies falls off rapidly above 600 cycles, but not too rapidly, and so that there are no sharp bends in it and that the rate of fall does not become too extreme at quite high frequencies. The components used for this purpose are the 30 microfarad capacitor C2 shunting the 270 k. input resistance R1, the entire network between the emitter of Q2 and the base of Q5, and the coil L1, the capacitor C3 and the resistor R2 connected in series across the output winding of T2. The other components in the amplifier circuitry are there to take care of a peculiar problem of transistor amplifier design, the need for temperature compensation. It is a characteristic of transistors that their back current, the current drawn by the collector when there is no current applied to the base in the grounded emitter circuitry, increases very drastically with temperature. If it were not for transistor Q1, the bias point of the base of Q2 would change with temperature, becoming more negative as the ambient temperature increases. The emitter of Q2 would also become more negative, as would the base of Q5, causing it to draw more current and leading to the possibility of clipping of the signal. Transistor Q1 prevents this by passing current opposite to that from the collector to base of Q2. The emitter of Q1 is purposely left unconnected, since the transistor is being used as a temperature compensating diode.

The 470 ohm resistor R3 in the emitter circuit of Q5 acts to hold the current through Q5 substantially constant despite changing temperature. The output amplifiers Q6 and Q7 are stabilized by their 8.2 ohm emitter resistors R4 and by the diode D5. The bias for these transistors (unlike tubes push-pull transistor amplifiers have to receive a small bias in the conducting direction) is obtained from the voltage drop across the diode D5, which is biased in the forward direction by current through resistor R5.

When the ambient temperature increases, the base to emitter resistance of Q6 and Q7, drops off. Normally, this would result in an increase in current through them. However, the voltage developed across the diode D5 drops off to the same extent. Therefore, the current remains substantially constant. A side benefit of this is that it provides the effect of a very low resistance in the base circuit. Hence, together with the 8.2 ohm emitter resistance it provides very good stabilization against effects produced by the changing collector cut-off current.

The remaining circuit portions of the cell module will be explained later in connection with the alarm and other functions.

The meter Module Circuit is diagrammed in FIG. 6. The voltage from the compensator lead of the reference cell is applied to pin 5M of the meter module plug. When the switch 32 is in the differential position, this voltage is applied to point A of the diode D12. This wave form is shown at point A. Diode D12 passes only the negative going half cycles and consequently the wave form when it reaches point B is as shown there. Since transistor Q12 is connected as an emitter follower, the wave form at its emitter reproduces that at the base and the voltage there is also represented by the wave form at B. Pin 7M on the meter module is connected to all the pins 4C of the cell modules. When any cell module switch 31 FIG. 3 is thrown to METER or TEST, the voltage at the compensator of the associated cell is applied to pin 7M of the meter module. Diode D11 and transistor Q11 function in exactly the same way as diode D12 and transistor Q12. The 0 to 100 microammeter M, together with series resistors R13, R14 and R17, is connected between the emitters of the two transistors. If the voltage applied to pin 7M is greater than that applied to pin 5M, the voltage at the emitter of Q11 will always be more negative than that of the emitter of Q12, and the difference in voltage at the emitters will be proportional to the difference in the A.C. voltages at the input pins. Therefore, the meter will read upscale and will give a direct indication of the difference in voltages. The transistors are powered from the minus 24 volts source through pin 3M and the positive from pin 2M. The operation with meter switch 32 at ABSolute is essentially the same, the only difference being that the input, instead of being taken from the reference cell through pin 5M, is taken from a secondary winding of distribution transformer 29 FIG. 3 through pin 9M, and that a greater resistance is switched into the meter circuit to allow for the higher range.

A preferred embodiment of the Reference Cell and Flasher Module is schematically shown in FIG. 7. The left hand portion of the circuit shown in this figure serves an amplifier with gain of unity to produce across a low resistance, R26 and R27, a voltage precisely equal to the negative half cycles of the reference cell compensator voltage with the addition of a few tenths negative D.C. voltage. The amplifier is driven by a minus 24 volt supply applied to pin 4F. The positive return is through pin 6F. The voltage from the compensator of the reference cell is applied through pin 1F and the resistor R20 to the base of transistor Q21. The capacitor C22 and the variable HVC9 inductor L21 at the base of transistor Q21 are used to produce phase shift without seriously changing the amplitude. Transistor Q21 is connected as an emitter follower. Therefore, at its emitter it reproduces the wave form presented at its base during the negative portions of the base excursion. Since the collector of Q21 is connected to ground, when the base is driven positive it becomes more positive than the collector. Therefore, the collector base diode conducts and appears as a very low impedance and the voltage is dropped across resistor R20. The result is that the voltage at the base is as shown on the drawing. The emitter load of Q21 consists of the collector of transistor Q22, the resistors R24 and R25 in series paralleled by the voltage regulating diode D21. The resistor R25 is also shunted by capacitor C21. Q22 functions as a constant current source. It has resistor R22 in its emitter circuit while its base is held at a constant D.C. voltage by the resistors R21 and R23 connected as a voltage divider. The net effect is that it acts to draw a constant current of approximately 2 mils. This aids Q21 in attaining as close as possible to unity gain. Therefore, the voltage at point C almost exactly duplicates the voltage at point E except for being approximately 0.2 volt more negative. Diode D21 is a special type of silicon diode which has the property that it conducts whenever its inverse voltage exceeds approximately 5 volts and provided the current passing through it is limited will tend to maintain approximately 5 volts across itself over a wide range of currents through it. A portion of this constant voltage is tapped off by resistor R25 and added to voltage appearing at point C. The capacitor C21 which shunts the resistor is to prevent any attenuation of the A.C. voltage at point C. Therefore voltage at point D is essentially the same as that at point C except that it is a few tenths of a volt more negative. Power transistor Q23 is also connected as an emitter follower and therefore has a high input impedance. Its emitter voltage which again reproduces the voltage at point C is applied through pin 2F to pin 7C of all the cell modules whose positions are connected for DIFFerential alarming. Pin 2F is also connected to pin 3F through resistor R26 and resistor R27. The voltage at the junction of these two resistors is coupled through pin 5F to pin 6C of all the cell modules whose positions are connected for DIFFerential alarming. Thus, the input at pin 7C of each cell module consists of approximately minus .4 volt D.C. and the negative half cycles exactly equal to those of the reference cell. The input to pin 6C of the cell module consists of the same voltages and in addition further negative going half cycles.

The flasher is shown in the right hand portion of FIG. 7. Operation begins with unijunction transistor Q30 which together with capacitor C25 and resistors R40 and R219 forms a relaxation oscillator. This oscillator triggers the bistable circuit consisting of transistors Q27 and Q28 to generate a square wave of approximately 1 second period. This square wave is further amplified to saturation by driver transistors Q26 and Q29. The outputs of these transistors are fed in turn to the bases of the complementary power output transistors Q24 and Q25 through resistors R46 and R47. Transistors Q24 and Q25 are alternately cut off and saturated, hence the voltage supplied to pin 8F and from thence to pins 8C of all cell modules varies from almost 12 volts negative to almost ground potential. The diodes D23 and D24 are respectively connected in the emitter circuits of the power output transistors Q24 and Q25. Ordinarily either a bias supply or a larger emitter resistor is necessary to ensure thermal stability of grounded emitter power transistors. The first is expensive and the second wastes power. By using a silicon diode connected in the forward direction as an emitter resistor it appears as a larger resistance when the transistor is cut off and it is needed for stability and as a small resistance when the transistor is conducting and it is just wasting power.

Referring again to FIG. 5 the heretofore undescribed alarm portion of the circuit wil be explained. Wherever the center arm of the alarm set potentiometer, P in the cell module is set, it will always pick off negative .4 volt D.C. and the negative half cycles from the reference cell as previously explained in connection with the Reference Cell Amplifier and Flasher Module. In addition, depending upon the setting, it will pick off a certain amount of additional negative half cycles. The winding between terminal 6' and 7' of the cell module output transformer T2 is conected between the top of the potentiometer and the 3,300 ohm resistor connected to the base of Q4. This winding has the same number of turns as the output winding 4' to 5'. It is so connected that its voltage is of opposite phase, that is, when the output winding of both this cell and the reference cell is going positive, the voltage developed from 7' to 6' is going negative and vice versa. If there were no output from the local amplifier, the voltage applied to the base of Q4 would always be at least minus .4 volt and greater than that during the negative half cycles of the reference cell voltage. As the output from local amplifier increases, the positive half-cycle voltages from the transformer 6'—7' winding subtract from those presented by the reference cell amplifier. When the level of output voltage from the local amplifier equals that of the reference cell plus that portion of negative half cycles tapped off by the potentiometer between 6' and 7', the potential at the 3,300 ohm resistor becomes less negative than 0.4 volt. When this occurs the circuit consisting of transistor Q3 and Q4 operates. During the time that the potential at terminal 7' of T2 has a negative potential of 0.4 volt or more, enough current flows into the base of transistor Q4 to saturate it; that is to say, to insure that the collector to emitter voltage is held to a very low value. Because of this, there is very little base voltage at transistor Q3 and hence very little current flowing through it. Q3 is therefore almost cut off.

Almost no current flows through the alarm light I1 and there is no output on pin 11C. When, however, the voltage at terminal 7' of transformer T2 becomes less negative than approximately minus 0.4 volt, Q4 is no longer fully saturated. Some voltage is between its collector and emitter. Therefore, Q3 begins to draw some current. This current flowing through the common 22 ohm emitter resistor acts to cut off Q4 still further. The whole operation is very similar to that which takes place in a cathode coupled multivibrator. It continues until finally Q3 is fully saturated and Q4 is completely cut off by the approximately 3½ volts drop across the 22 ohm resistor. Light I1 is now lit and a voltage of approximately 6 volts more positive than the negative supply is coupled through the diodes D1 and D2 to pins 9S and 11C. Q3 and Q4 remain in this condition with Q3 conducting and Q4 not conducting until the voltage applied to terminal 7' of transformer T2 is at least 0.4 volt more negative than that at the base of the emitter caused by the lamp current flowing through the 22 ohm resistor. That is, point 7' must go at least minus 3.9 volts. This occurs when the output voltage from T2 and T2' winding 6'—7' is going through its negative cycle. At this point, the circuit Q3 and Q4 switches back to its original state with Q4 heavily conducting and Q3 non-conducting. Thus, when the output voltage from transformer T2 is greater than the reference cell voltage plus the bias voltage picked off by the alarm potentiometer P, the current through Q3 and hence the current through lamp I1 consists of a series of square waves at 600 cycles per second.

The preceding paragraph has been on the assumption that a constant minus 12 volt source was connected to pin 8C of the cell module. Actually, however, the voltage connected to that point comes from the flasher module and is at the level of minus 12 volts for approximately a second and a half, 0 volts for a second and a half, minus 12 volts for a second and a half, etc. The result of this is that instead of the light going on continuously when the alarm condition occurs, it is on for periods of a second and a half at a time. When the voltage is 0 at pin 8C, even with Q4 non-conducting, Q3 cannot draw enough base current to permit the collector current to flow strongly enough to light the lamp and to operate the alarm relays. So long as the normal-silence switch 35 is left in the normal position, resistor R18 is not connected. Therefore, no current flows directly from pin 8C through the lamp. However, when the switch is thrown over to silence, the lamp is lit through R18 and through Q25 of the flasher module when the voltage of pin 8C is at ground level. The result is that when the switch is thrown to silence the lamp will flash when no alarm condition exists and will glow steady when an alarm condition exists. Also, of course, the output at pin 11C is interrupted when the switch is thrown to silence. However, the output through pin 9C, which is used to operate the dump and light outputs is not affected by the position of the silence switch.

There are several minor points which should be cleared up with respect to the module. One is the shorted out 390 ohm resistor shown connected to pin 5C. In standard type specific conductivity equipment a 390 ohm resistor is used within the panel in series with the compensator. In the present invention, this resistor is incorporated directly in the conductivity cell. This permits more favorable high frequency characteristics of the amplifier. However, a situation may arise in which standard cells only are available from local stocks. If such should be the case, the short circuit across the 390 ohm resistor would be removed. A second matter that should be cleared up is the explanation of the variable inductor L21, that is found at the input to the reference cell amplifier FIG. 7. The reason for this may be seen in the .2 microfarad capacitor C3 used on the output of the transformer of the winding 4'—5' on transformer T2 FIG. 5. Because of this capacitor which is quite large, the transformer sees a capacitance load on the output winding. Since there is a resistance in the transformer winding the voltage appearing at the output line would not be quite the same as the voltage induced in the transformer winding. There will be a phase shift between them. Since the voltage across terminals 4' and 5' is determined by the feedback network and held to a precise multiple of the output from the regulated oscillator the voltage at 6'—7' will differ from this. Rather than attempt to correct each one of the 15 modules, it is simpler to shift the phase at the input to the reference amplifier. A third matter requiring clarification relates to pins 13C and 14C.

When the meter test switch on the cell module is pressed into the test position, pins 13C and 14C, which are connected to a dummy cell interior to the panel are substituted for pins 5C and 1C, which go to the actual supervised cell. Hence, when the test switch is pressed to test, a known reading should appear on the meter and the correct operation of the module is thereby proven.

Some of the various types of alarm circuits useable in the salinity indicator of the present invention are illustrated in FIGS. 8A, B, C and D. FIG. 8A shows the simplest form that of alarm. The input comes from all the pin 11C connections from the cell modules that are desired to operate the alarm. Consequently this input is normally at minus 12 volts. When no alarm condition exists no current is passing through the alarm light I1. When an alarm condition exists and if the silent switch 35 is at normal, the voltage picked off by the diode D2 going to pin 11C will be a square wave. Half the time it will be at the minus 12 volts; half the time with transistor Q3 conducting, it will have dropped to approximately minus 6 volts. The transistor Q40 in the alarm circuit will be cut off when the input is at minus 12 volts, since then its emitter and base will be at the same voltage. However, when the input voltage becomes less negative it will be able to conduct. The capacitor C40 across the relay coil 37 will rapidly build up to a charge equal to the total drop of voltage from the alarm circuit. The 6 volts D.C. developed across the capacitor is enough to cause relay 37 to close its contact sounding the external alarm.

It is sometimes required that two separate alarm circuits be provided, where one alarm will be sounded only by the most vital cells and the other sounded by any cell that goes into an alarm condition. FIG. 8B shows this connection. Here, if an alarm condition should exist at cells 2 and 8, they will directly operate the remote alarm through the same circuit described above. The voltage will also be conducted through diode D41 to operate the local alarm. All other alarm conditions in other cells will operate the local alarm but since diode D41 will then be in a blocking state, they will not be able to operate the remote alarm. For light output the connection to the cell module is made through pin 9C and is unaffected by the position of the silencing switch 35. At the alarm relays, the connections are exactly the same as they are for the alarm circuit. FIG. 8C shows a circuit used when it is desired to light remote lights to duplicate the behavior of the panel alarm lights on cells 2 and 8, and also to sound an external audible alarm if either light is lit. The light type of output operates whenever the alarm light is lit regardless of whether that is because of an alarm condition or to indicate silence.

The dump type of output is similar to the light in that it is independent of the position of the silencing switch and is taken from pin 9C of the cell module but incorporates a provision to prevent operation when the signal is generated because the lamp is flashing because of the silencing switch having been thrown to silence. The circuit is shown of FIG. 8D. There the input to the base of Q42 is of the same type as before coming from pin 9C of the module arranged to dump and Q42 will therefore conduct whenever the alarm light of the cell module is lit, whether from excess salinity or from silencing, For the relay 38 to be energized however, Q41 must also conduct. Q41 will conduct only when Q43 is cut off. Q43's base is excited from the silence output of the flasher, pin 9F. Therefore, Q43 will conduct and prevent Q41 from conducting whenever the alarm light is lit by the silencing signal. Thus, the relay will close only upon a condition of high specific conductivity. When it closes it applies 115 volt 60 cycles to the flasher shown which acts as a time delay, preventing unnecessary dumping on maneuvering surges. After two seconds the flasher opens its contacts, de-energizing the power relay 39 which, in turn, opens its contacts and releases the dump value.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. Apparatus for directly reading the salinity of a fluid comprising a conductivity cell having a pair of electrodes and a temperature compensator resistor connected at one terminal to one of said electrodes, an amplifier, a source of alternating current potential in series with said conductivity cell electrodes and forming the input of said amplifier, the other terminal of said temperature compensator resistor being connected to the output of said amplifier whereby the resistor forms a negative feedback connection to the amplifier input and the output voltage of the amplifier is directly proportional to the salinity of a fluid in which said cell is immersed.

2. Apparatus according to claim 1 wherein said amplifier is a high gain, transistorized amplifier.

3. Apparatus according to claim 2 wherein said amplifier is additionally provided with a temperature stabilizing element connected to the amplifier input.

4. Apparatus according to claim 3 wherein said temperature stabilizing element of the amplifier comprises a transistor acting as a diode the transistor emitter being unconnected.

5. A method of continuously determining the salinity of a fluid which comprises immersing in said fluid a conductivity cell having electrodes connected in series with a temperature compensator element, applying a potential across the electrodes of said cell, maintaining said electrode potential at a substantially constant value regardless of changes in the fluid conductivity and temperature, and reading the salinity of the fluid as a directly proportional value of the voltage across said cell electrodes and series compensator element.

6. Apparatus for the differential reading of the salinity of a fluid at different locations comprising a reference conductivity cell and at least one other conductivity cell for immersion in the fluid spaced from said reference cell for comparison of the salinity reading at separate locations, each of said cells having a pair of electrodes and a temperature compensator element connected at one terminal with one of the electrodes, a pair of amplifiers associated respectively with said pair of conductivity cells, a source of alternating current potential in series with the electrodes of each of said conductivity cells and connected as the input to the associated amplifier, a negative feedback circuit connecting the output of each of said amplifiers to the other terminal of each of said associated temperature compensator elements, a meter, and means for opposing the output voltages of said amplifiers and applying the difference to said meter whereby the voltage differential is directly proportional to the difference of salinity at the separate fluid locations of said conductivity cells.

7. Apparatus according to claim 6 wherein is additionally provided an alarm and circuit means triggered by said opposing output voltages of the amplifiers to operate said alarm when the differential voltage exceeds a predetermined value.

8. Apparatus according to claim 6 wherein is additionally provided switching means for connecting and disconnecting the outputs of said amplifiers individually to said meter whereby either the actual or differential salinity at said conductivity cell location may be read upon said meter.

9. Apparatus for directly reading the salinity of a fluid comprising a conductivity cell having a pair of electrodes and a temperature compensator element connected in series with said electrodes, means for applying and maintaining a substantially constant value potential across the cell electrodes regardless of changes in the fluid conductivity and the temperature, and means for measuring the potential across said cell electrodes and series compensator element to indicate values directly proportional to the salinity of the fluid.

References Cited in the file of this patent
UNITED STATES PATENTS

| | | |
|---|---|---|
| 2,450,450 | Schmidinger | Oct. 5, 1948 |
| 2,456,117 | Feller | Dec. 14, 1948 |
| 2,586,169 | Kline | Feb. 19, 1952 |
| 2,751,501 | Eberhard | June 19, 1956 |
| 2,814,795 | Spooner | Nov. 26, 1957 |
| 2,816,228 | Johnson | Dec. 10, 1957 |